United States Patent
Sasaki (10) Patent No.: US 8,397,097 B2
(45) Date of Patent: Mar. 12, 2013

(54) COMPUTER SYSTEM AND OPERATING METHOD THEREOF

(75) Inventor: Shigero Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 257 days.

(21) Appl. No.: 12/922,785

(22) PCT Filed: Apr. 8, 2009

(86) PCT No.: PCT/JP2009/057190
§ 371 (c)(1),
(2), (4) Date: Sep. 15, 2010

(87) PCT Pub. No.: WO2009/125789
PCT Pub. Date: Oct. 15, 2009

(65) Prior Publication Data
US 2011/0022876 A1 Jan. 27, 2011

(30) Foreign Application Priority Data
Apr. 9, 2008 (JP) .................................. 2008-101282

(51) Int. Cl.
*G06F 1/08* (2006.01)
(52) U.S. Cl. .......................... 713/501; 713/322; 713/600
(58) Field of Classification Search .................... 713/501
See application file for complete search history.

(56) References Cited

U.S. PATENT DOCUMENTS

| 7,730,340 B2 * | 6/2010 | Hu et al. ........................ 713/323 |
| 2002/0104032 A1 * | 8/2002 | Khurshid et al. .............. 713/322 |
| 2008/0201591 A1 * | 8/2008 | Hu et al. ........................ 713/323 |
| 2009/0210740 A1 * | 8/2009 | Huang et al. .................. 713/502 |
| 2011/0154321 A1 * | 6/2011 | Tian et al. ......................... 718/1 |

FOREIGN PATENT DOCUMENTS

| JP | 9-237132 A | 9/1997 |
| JP | 10-268963 A | 10/1998 |
| JP | 11-65845 A | 3/1999 |
| JP | 11-110063 A | 4/1999 |
| JP | 11-353052 A | 12/1999 |
| JP | 2000148475 A | 5/2000 |
| JP | 2001005661 A | 1/2001 |
| JP | 2003196083 A | 7/2003 |
| JP | 2004038291 A | 2/2004 |
| JP | 2005071365 A | 3/2005 |
| JP | 2006302306 A | 11/2006 |
| WO | 0221245 A | 3/2002 |

OTHER PUBLICATIONS

International Search Report for PCT/JP2009/057190 mailed Jul. 21, 2009.
V. Pallipadi, "Enhanced Intel SpeedStep Technology and Demand-Based Switching on Linux", http://softwarecommunity.intel.com/articles/eng/1611.htm, Oct. 16, 2007.
"Enhanced Intel SpeedStep Technology for Intel Pentium M Processor", http://softwarecommunity.intel.com/articles/eng/1611.htm, Mar. 2004.

(Continued)

*Primary Examiner* — Ryan Stiglic (57) ABSTRACT

A computer system is provided with an event counter, a CPU, a memory, an external device, a hub M31 and a hub I33. The computer system is further provided with a clock change module 50. System software 60 and applications 70a to 70m operate, and the clock change module 50 specifies a clock with which the applications 70 are executed. Based on stall cycles read from the event counter 21, the clock change module 50 specifies the clock that maximizes performance or power consumption characteristic while satisfying execution constraint 90.

10 Claims, 5 Drawing Sheets

OTHER PUBLICATIONS

"Intel 64 and IA-32 Architectures Software Developer's Manual, vol. 3B: System Programming Guide, Part 2", http://www.intel.com/products/processor/manuals/index.htm, Nov. 2007, A-46, vol. 3.

"Performance Counter of Intel Core Micro Architecture•Processor", http://jp.xlsoft.com/documents/intel/seminar/4_Core2_perf_counters_J.pdf, 2007, pp. 1-45.

* cited by examiner

EXECUTION INFORMATION 80i

| EVENT IDENTIFIER | PENALTY | NUMBER OF OCCURRENCES |
|---|---|---|
| CPU_CLK_UNHALTED.CORE | 0 | 0 |
| Load_Blocks.ADR | 5 | 0 |
| Load_Blocks.UNTIL_RETIRE | 22 | 0 |
| ILD_STALLS | 6 | 0 |
| ... | ... | ... |

Fig. 5

COMPUTER SYSTEM AND OPERATING METHOD THEREOF

This application is the National Phase of PCT/JP2009/057190, filed Apr. 8, 2009, which is based upon and claims the benefit of priority from Japanese patent application No. 2008-101282, the disclosure of which is incorporated herein in its entirely by reference.

TECHNICAL FIELD

The present invention relates to a computer system and an operating method of the computer system. In particular, the present invention relates to a computer system that can change an operation clock of a CPU based on stall cycles of the CPU, and an operating method of the computer system.

BACKGROUND ART

In recent years, a CPU provided with a function that can change a clock frequency by software control for the purpose of reducing power consumption is known. A method of software controlling the Enhanced Intel SpeedStep Technology (EIST) that is an example of the function of changing the clock frequency is disclosed, for example, in Venkatesh Pallipadi "Enhanced Intel SpeedStep Technology and Demand-Based Switching on Linux" (http://softwarecommunity.intel.com/articles/eng/1611.htm, Jan. 1, 2005). The EIST is installed, for example, in PentiumM (registered trademark: Pentium) that is a CPU produced by Intel Corporation. The fact that a time required for changing the clock frequency is about 10 microseconds and there are six possible combinations of clock and voltage; (1.6 GHz, 1.484 V), (1.4 GHz, 1.420 V), (1.2 GHz, 1.276V), (1.0 GHz, 1.164 V), (800 MHz, 1.036 V) and (600 MHz, 0.956 V) is described in Table1.1 (for example, "Enhanced Intel SpeedStep Technology for Pentium M Processor" (http://softwarecommunity.intel.com/articles/eng/1611.htm, March, 2004).

In recent years, a CPU that can count CPU internal events related to performance is known, for example described in Japanese Patent Publication JP-2000-148475. A wide variety of events is known, and six events; "Unhalted Core Cycles", "Unhalted Reference Cycles", "Instruction Retired", "LLC Reference", "LLC Misses", "Branch Instruction Retired" and "Branch Misses Retired" are described in the Section A.4 of the above-mentioned document. Besides, many events can be counted. Moreover, a fact that it is not easy to measure performance of a CPU having a complicated execution configuration such as out-of-order execution is described, for example, in "Performance Counter of Intel Core Micro Architecture-Processor" (http://jp.xlsoft.com/documents/intel/seminar/4_Core2_perf_counters_J.pdf, 2007).

In a conventional case where the CPU performance strongly depends on retire (execution completion) of instructions, it is sufficient to count a small number of events. In recent years, however, the CPU performance does not depend on the number of retires but strongly on "stall cycles" due to numerous factors. The "stall cycle", which is a cycle in which there are instructions that should be executed but cannot be executed, is different from an idle cycle having no instruction to be executed.

Moreover, a method of changing the clock frequency of the CPU in accordance with a load state of the CPU, a remaining capacity of a battery and a heat temperature of the CPU is disclosed, for example, in Japanese Patent Publication JP-H09-237132A. Japanese Patent Publication JP-H09-237132A discloses a technique that detects the load state of the CPU by recognizing the number of times of the idle state based on the number of setting a flag indicative of a busy state that is set every time the CPU accesses an I/O (Input/Output) or a memory.

A method of increasing or decreasing a value of a performance index in a range of an electric power consumption index specified by a user is disclosed, for example, in Japanese Patent Publication JP-H11-353052A. The typical performance index in the method described in Japanese Patent Publication JP-H11-353052A is the number of user mode instructions that are executed. Although the number of instructions strongly depends on the clock frequency of the CPU, they do not always have a proportional relationship. Therefore, the clock frequency is determined by measuring the value of the performance index before and after the change in the clock frequency and then considering whether or not a change rate exceeds a predetermined threshold value. On the other hand, a total number of executed instructions is used as the electric power consumption index.

Also, a method of executing the version-up and installation of software at a higher clock frequency as compared with a usual case is disclosed, for example, in Japanese Patent Publication JP-2000-148475A. A computer installed in a mobile body such as a car and the like is often operated at a performance lower than the highest performance or the highest clock frequency of a hardware, in consideration of change in a temperature, continuous battery drive and the interference with other devices. However, when the frequent change in the software in recent years is taken into consideration, this is practically inconvenient unless high speed processing is not carried out at the time of the version-up or installation.

Moreover, a method of operating the CPU at its highest performance or highest clock in a period of system start-up processing is disclosed, for example, in Japanese Patent Publication JP-2001-5661A. The method disclosed in Japanese Patent Publication JP-2001-5661A considers to lower the clock frequency of the CPU to execute an user application in order to reduce the power consumption. This is a method that prevents the system from being re-started at a relatively low speed at a clock less than the highest speed of the CPU, when the system is shut down or standby.

A method of dynamically changing the clock frequency of the CPU when carrying out a process of an I/O bound is disclosed, for example, in Japanese Patent Publication JP-2003-196083A. In the method disclosed in Japanese Patent Publication JP-2003-196083A, a clock is specified for each page that is a unit of a memory management. Instruction codes recorded in the page is executed at the specified clock. The clock is specified in a stepwise manner. For example, the clock frequency is specified in such a way that an OS kernel is executed at a high speed, an input/output waiting function of the OS kernel is executed at a low speed, and an application program is executed at an intermediate speed.

A method of controlling a clock so as to optimize the performance of a device without exceeding the electric power/heat budget of a system is disclosed, for example, in Japanese Patent Publication JP-2005-71365A. The method disclosed in Japanese Patent Publication JP-2005-71365A uses a relative load on a plurality of devices generated by the execution of an application program, mainly a memory device and an I/O device. When the application program accesses the memory device in many times, the clock frequency of the memory device is set relatively higher. On the other hand, when the application program accesses the I/O device in many times, the clock frequency of the I/O device is set relatively higher.

A method of changing the clock frequency of the CPU depending on a batch processing or an interactive processing is disclosed, for example, in Japanese Patent Publication JP-2006-302306A. According to the method disclosed in Japanese Patent Publication JP-2006-302306A, when the batch processing that is rate-limited by the CPU is executed, the clock frequency is set higher. When the interactive processing that is not rate-limited by the CPU such as a word processor is executed, the clock frequency is set lower. However, it is difficult that a user effectively controls the balance between the CPU performance and the system power consumption. Therefore, a graphic interface for adjusting the clock frequency is provided.

A computer system that stops the clock based on an update frequency of a register and whether or not a process is caused by interruption is disclosed, for example, in Japanese Patent Publication JP-H11-110063A. What is assumed in the computer system disclosed in Japanese Patent Publication JP-H11-110063A is a system in which most of the processing requests from the outside are generated by the interruption, and the interruption processing is required to be carried out at a high speed. Whereas, the processing of a key input wait and a completion wait of an I/O device need not be carried out at a high speed. In the wait states, when they are considered to be in the states of a software loop, a HALT instruction execution and the like, writing to the register is not generated at this time.

As described above, in the cases of the conventional techniques, the clock frequency of the CPU cannot be determined based on the stall cycles. In the cases of Japanese Patent Publication JP-2003-196083A and Japanese Patent Publication JP-2005-71365A, the clock frequency is decreased only for I/O in which the idle cycle is evidently generated. Similarly, even if the idle cycles of the I/O processing are considered as the CPU load as described in Japanese Patent Publication JP-H09-237132A, the stall cycles cannot be taken into consideration. In the cases of Japanese Patent Publication JP-2000-148475A, Japanese Patent Publication JP-2001-5661A and Japanese Patent Publication JP-2006-302306A, the clock frequency is increased only in the particular processing specified beforehand such as the version-up, the system start, the batch processing and the like. However, the stall cycles generated by them are not taken into consideration. In the case of Japanese Patent Publication JP-H11-353052A, although the clock frequency of the CPU is changed based on the number of retired instructions, the stall cycles cannot be taken into consideration. The reason is that the stall cycle is not always short even when the number of instructions is large, because the number of cycles required for the execution is different depending on the instruction. That is, when a quotient of the number of cycles other than the stall cycles and the number of total cycles is assumed to an execution efficiency of the instructions, the dependency of the execution efficiency on the number of retired instructions is different depending on the case. Moreover, in the case of the computer system described in the patent document 8, the clock of the CPU is stopped based on the update frequency of the register. Although there is correlation between the update frequency of the register and the stall cycles, the absolute values of the stall cycles are not referred to. Thus, to what extent the clock is to be reduced cannot be determined quantitatively. To determine whether or not to stop the clock is merely disclosed.

PROR ART DOCUMENT

Patent Document

Patent Document 1: Japanese Patent Publication JP-H09-237132A
Patent Document 2: Japanese Patent Publication JP-H11-353052A
Patent Document 3: Japanese Patent Publication JP-2000-148475A
Patent Document 4: Japanese Patent Publication JP-2001-5661A
Patent Document 5: Japanese Patent Publication JP-2003-196083A
Patent Document 6: Japanese Patent Publication JP-2005-71365A
Patent Document 7: Japanese Patent Publication JP-2006-302306A
Patent Document 8: Japanese Patent Publication JP-H11-110063A Non-Patent Document Non-Patent Document 1: Venkatesh Pallipadi, "Enhanced Intel SpeedStep Technology and Demand-Based Switching on Linux",
http://softwarecommunity.intel.com/articles/eng/1611.htm, Jan. 1, 2005.
Non-Patent Document 2: "Enhanced Intel SpeedStep Technology for Pentium M Processor",
http://softwarecommunity.intel.com/articles/eng/1611.htm, March, 2004.
Non-Patent Document 3: "Intel 64 and IA-32 Architectures Software Developer's Manual Volume3 B: System Programming Guide, Part 2",
http://www.intel.com/products/processor/manuals/index.htm, November, 2007.
Non-Patent Document 4: "Performance Counter of Intel Core Micro Architecture·Processor",
http://jp.xlsoft.com/documents/intel/seminar/4_Core2_perf_counters_J.pdf, 2007.

DISCLOSURE OF INVENTION

The present invention provides a computer system that changes an operation clock frequency of a CPU based on stall cycles, an operating method and a program of the computer system.

The computer system according to the present invention uses a CPU having an event counter, a cache and an arithmetic unit to operate system software and at least one application software. The computer system further has a clock change module operating under control of said event counter and changes, based on stall cycles of said application software, the clock at which said application software is executed.

A method of operating a computer system according to the present invention is a method of operating a computer that uses a CPU to operate system software and at least one application software. The method includes: a step of detecting, with respect to each application software, stall cycles in which an instruction is not executed by said CPU; and a step of changing an operation clock of said CPU based on said detected stall cycles.

A program according to the present invention is a computer-readable program for achieving the above-described method of operating the computer system, which is stored in a recording medium.

According to the present invention, an application with more stall cycles is executed at a lower clock, while an application with less stall cycles is executed at a higher clock. It is therefore possible to enhance an execution efficiency of instructions.

Moreover, the clock for the CPU executing the application is specified, while estimating a relationship between the current stall cycles and stall cycles after the clock change such that CPU utilization falls within a specified range. Therefore, the power consumption is suppressed and sufficient performance can be provided.

Furthermore, the clock is specified with respect to each application, while estimating a relationship between the current stall cycles and stall cycles after the clock change such that power consumption falls within a specified range. Therefore, the power consumption can be reduced while suppressing decrease in the performance.

DESCRIPTION OF EMBODIMENTS

Next, a computer system and an operating method of the computer system according to the present invention will be described in detail with reference to the attached drawings.

Figure 1:
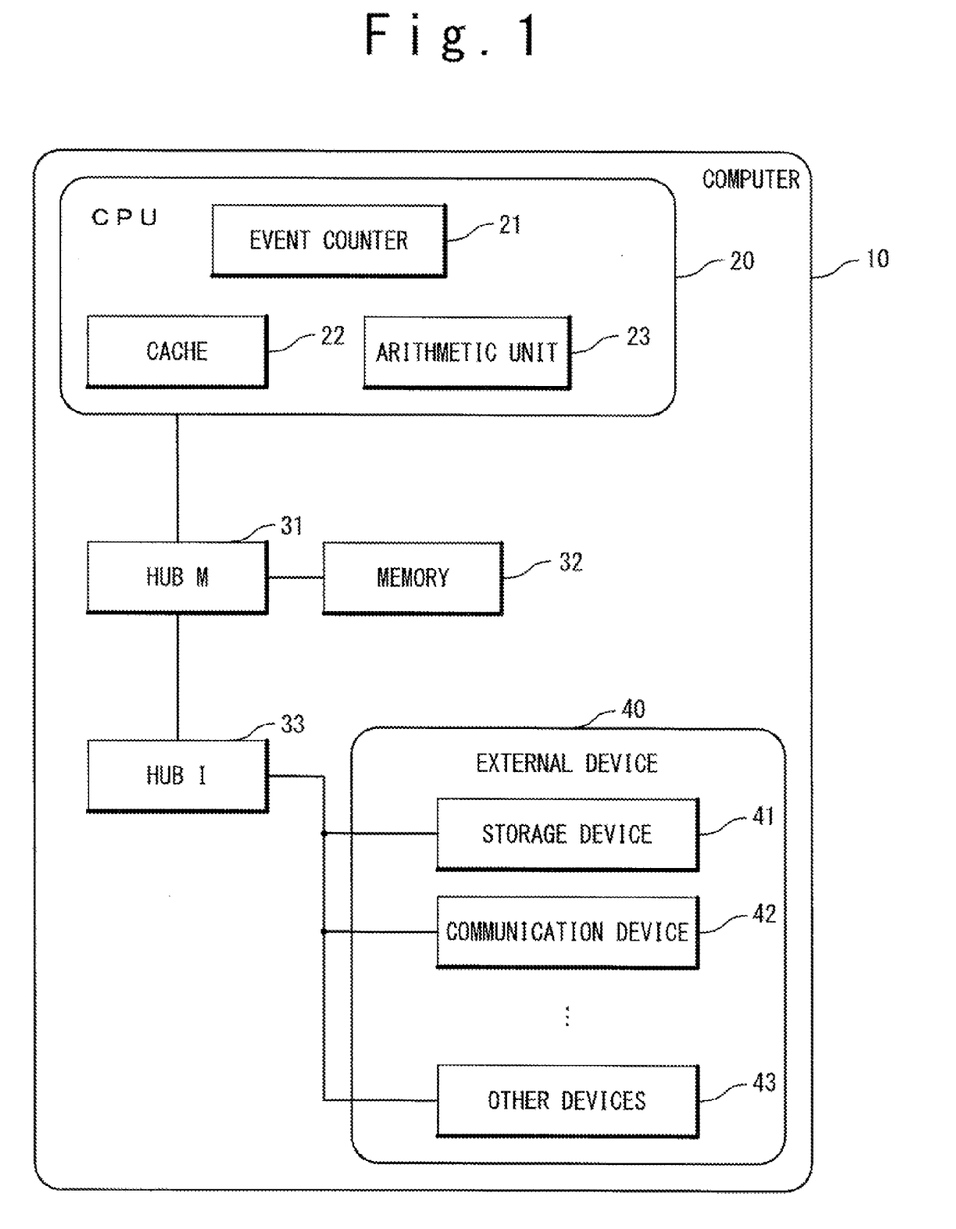
FIG. 1 is a function block diagram showing a basic configuration of a computer of an exemplary embodiment of the present invention.

FIG. 1 is a function block diagram showing a system configuration of an exemplary embodiment of the computer system according to the present invention. The computer system according to the present invention is achieved by a computer 10 shown in FIG. 1. The computer 10 has a CPU (Central Processing Unit) 20, a hub M31, a memory 32, a hub I33 and an external device 40. In the computer 10, the hub M31 is connected to the CPU 20 and the memory 32. Moreover, the hub M31 is connected to the external device 40 through the hub I33.

The CPU 20 has an event counter 21 capable of counting a plurality of events, a cache 22 and an arithmetic unit 23. The cache 22 is a memory device that can operate at a higher speed and has a smaller capacity than the memory 32, and a copy of a part of data stored in the memory 32 is stored in the cache 22. The arithmetic unit 23 manipulates data stored in the memory 32 only in a case where there is no necessary data in the cache 22 (cache miss). The cache miss is one of events that are counted by the event counter 21. Meanwhile, the external device 40 includes, for example, a storage device 41, a communication device 42 and other devices 43. In general, the storage device 41 as the external device 40 connected to the hub I33 has a larger capacity and operates at a lower speed than the memory 32, and the data stored therein is used after being copied to the memory 32.

Figure 2:
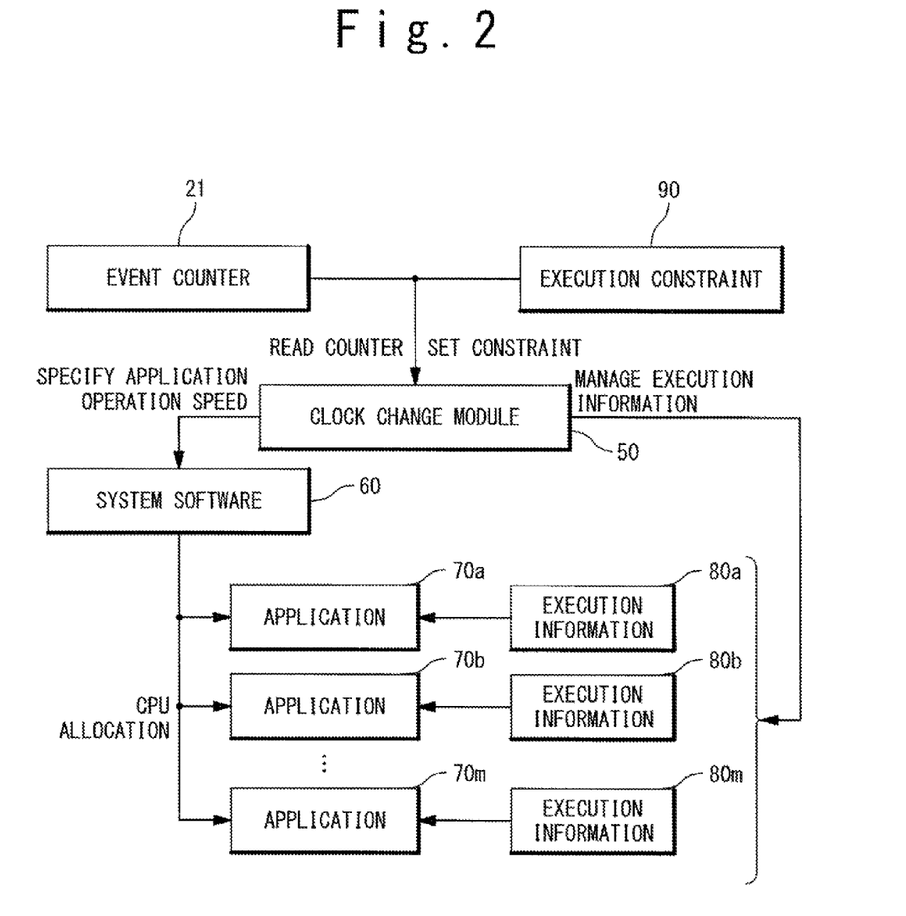
FIG. 2 is a block diagram showing a configuration of a main part of an exemplary embodiment of a computer system of the present invention.

Next, FIG. 2 is a function block diagram showing a main part of the exemplary embodiment of the computer system according to the present invention. The computer system of the present invention can be achieved by adding a clock change module 50 shown in FIG. 2 to the existing computer system. In an example of the existing computer system, system software 60 operates on the computer 10. The system software 60 allocates a plurality of applications 70a, 70b, ..., 70m to the CPU 20.

The system software 60 also has a function of managing execution time of the applications 70 (70a to 70m). An execution constraint 90 is given to the computer system. The execution constraint 90 specifies a constraint condition on the performance or the power consumption that should be satisfied when the application 70 is executed, the events that are monitored for judging whether or not the condition is satisfied, and penalty. The clock change module 50 reads the numbers of occurrences of the events specified by the execution constraint 90 from the event counter 21, and manages them as execution information 80 (80a to 80m) with respect to each application 70. Based on these execution information 80, an appropriate clock frequency satisfying the execution constraint 90 is specified.

Figure 3:
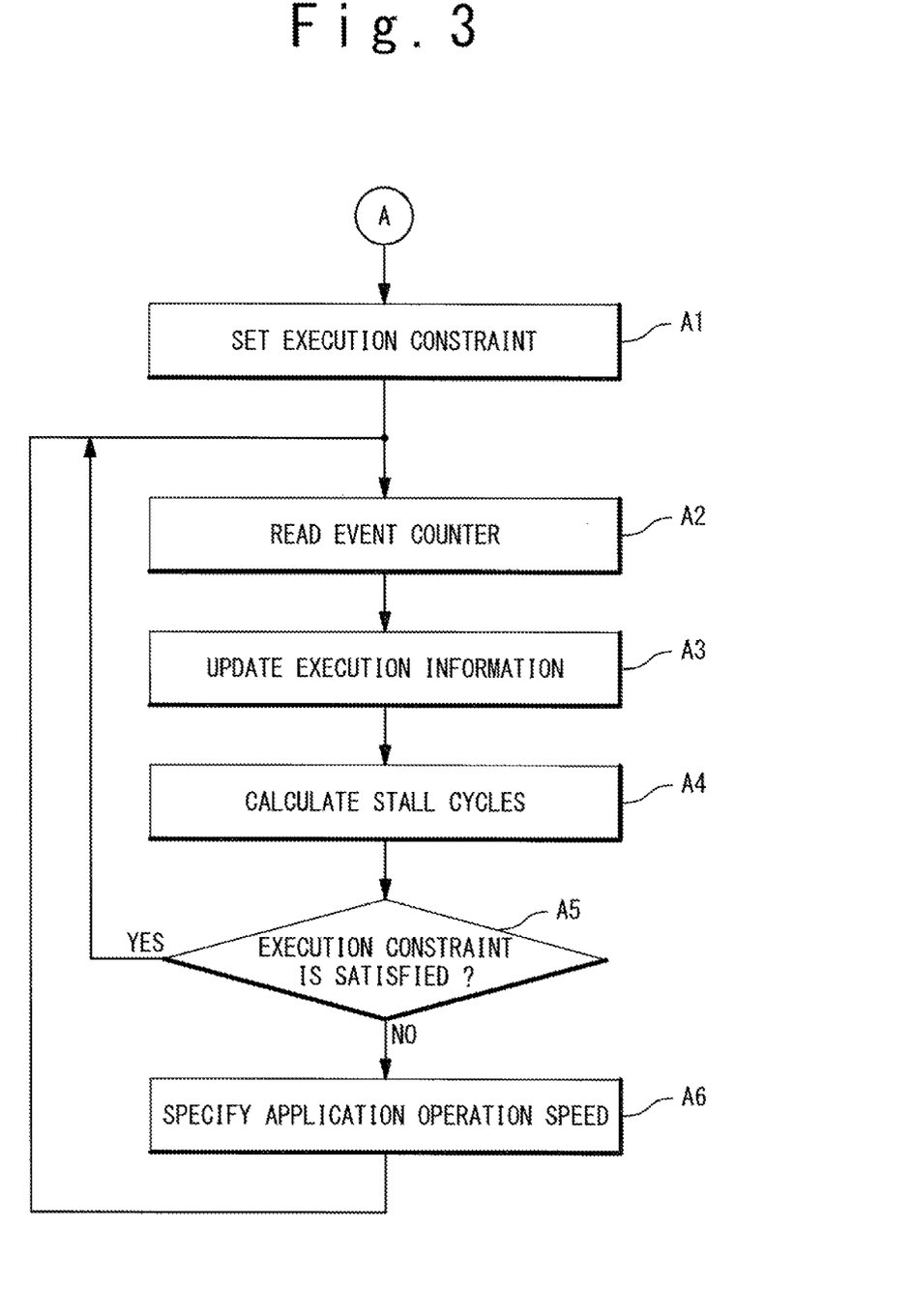
FIG. 3 is a flow chart for explaining an operating method of a computer according to the present invention.

Next, an entire operation of the computer system according to the present invention will be described in detail with reference to a flow chart shown in FIG. 3.

Figure 4:
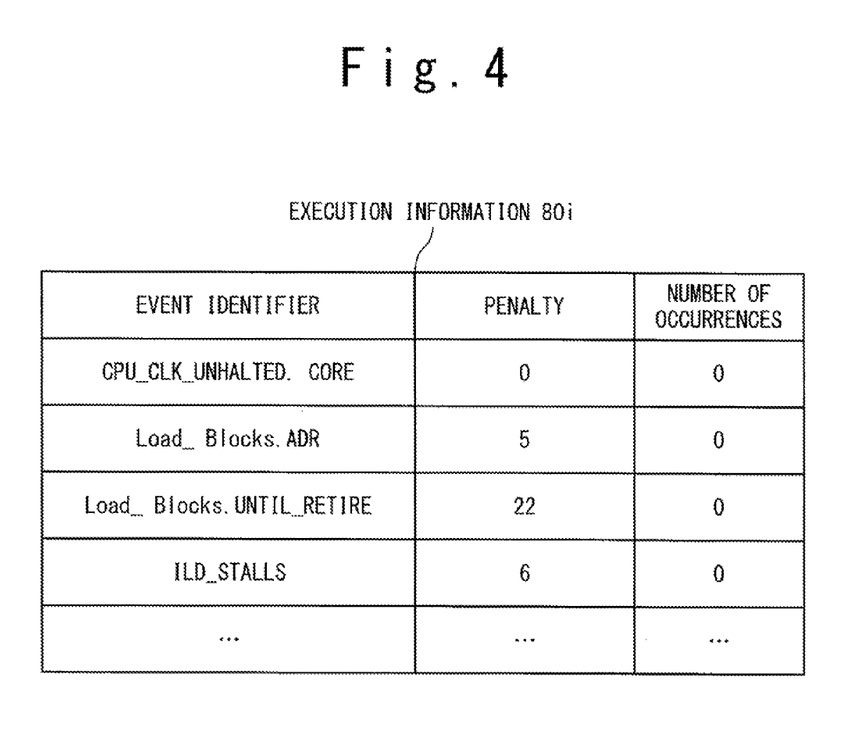
FIG. 4 is an explanatory diagram of a concrete example of execution information $80i$ ($1 \leq i \leq m$) for performing the operating method of the computer according to the present invention.

The clock change module 50 reflects the events and the penalties specified by the execution constraint 90 in the execution information 80a to 80m, and reads the constraint condition to set the execution constraint (Step A1). The execution information 80a to 80m each includes the event, the penalty and the number of occurrences of the event. For example, as shown in FIG. 4, the execution information 80i ($1 \leq i \leq m$) is managed in a table form. An initial value of the number of occurrences is 0. The specified execution information may be different with respect to each application.

The clock change module 50 performs event counter reading (Step A2) that reads the event specified by the execution information 80i associated with the application 70i allocated to the CPU 20 from the event counter 21. Next, a difference between the number of occurrences of the event currently read-out and the number of occurrences of the event previously read-out and recorded in the execution information 80i is calculated, and then the number of occurrences, namely, the execution information is updated (Step A3). The updating of the execution information is performed with respect to each event. Then, the stall cycles which is a summation of products of the differences in the number of occurrences calculated in the Step A3 and the penalties is calculated (Step A4).

Next, whether or not the stall cycles calculated in the Step A4 satisfies the execution constraint 90 is determined (Step A5). If the execution constraint is not satisfied (Step A5: No), an application clock frequency, namely, an application operation speed that satisfies the execution constraint 90 is specified (Step A6). If the execution constraint is satisfied (Step A5: Yes), the processing returns back to the above-described Step A2.

The above-described operating method can be achieved by the CPU executing a program loaded to the memory 32 from a recording medium or a storage device (not shown).

Next, the operating method of the computer system according to the present invention will be described based on concrete examples. Described in the first concrete example is a case where the execution constraint 90 specifies that the constraint condition is "the execution efficiency being equal to or more than 50%" and the events to be observed include "CPU_CLK_UNHALTED.CORE" with the penalty of 0, "MEM_$_{LOAD\_}$RETIRED.L1D_$_{LINE\_}$MISS" with the penalty of 12, "MEM_LOAD_RETIRED.L2D_LINE_MISS" with the penalty of 200 and "MEM_LOAD_RETIRED.DTLB_MISS" with the penalty of 10. Here, the "execution efficiency" is a ratio of cycles other than the stall cycles to the total cycles.

The event with the penalty of 0 represents the total execution cycles. The other events with the positive penalties cause the stall cycles. Stall cycles caused by other events that are not specified in the execution constraint is not taken into consideration. The penalty of the event having the positive penalty varies depending on the clock of the CPU 20. The reason is that the penalty of the event having the positive penalty is mainly caused by a difference in speed between the CPU 20 and the memory device. For example, when a cache miss occurs, namely, when the data stored not in the cache 22 but in the memory 32 is read, the data cannot be read-out within one CPU cycle. Therefore, the CPU 20 has to wait until the data is transferred from the memory 32. This cycle corresponds to the above-mentioned "stall cycle". Thus, when the clock of the CPU 20 becomes the half, the stall cycles also become the half, although the execution speed of the application 70 is lowered.

In the above-described Step A1, the clock change module 50 generates the execution information 80 from the execution constraint 90. That is, it manages the event identifier, the penalty and the number of occurrences. For example, the execution information 80 is expressed by the following Table. 1.

TABLE 1

| EVENT IDENTIFIER | PENALTY | NUMBER OF OCCURRENCES |
|---|---|---|
| CPU_CLK_UNHALDTED.CORE | 0 | 0 |
| MEM_LOAD_RETIRED.L1D_LINE_MISS | 12 | 0 |
| MEM_LOAD_RETIRED.L2D_LINE_MISS | 200 | 0 |
| MEM_LOAD_RETIRED.DTLB_LINE_MISS | 10 | 0 |

In the Step A2, with regard to the application 70$i$, the clock change module 50 reads the numbers of occurrences of the events from the event counter 21. Let us consider a case where the CPU_CLK_UNHALTED.CORE is 20,000,000, the MEM_LOAD_RETIRED.L1D_LINE_MISS is 150,000, the MEM_LOAD_RETIRED.L2D_LINE_MISS is 50,000 and the MEM_LOAD_RETIRED.DTLB_LINE_MISS is 20,000. In the Step A3, the clock change module 50 calculates increments of the numbers of occurrences of the events and updates the numbers of occurrences. Since the numbers of occurrences of the four events as measurement targets have been 0, the increments of the numbers of occurrences are equal to the measured values. The numbers of occurrences are updated to be as shown in the following Table. 2.

In the Step A4, the clock change module 50 calculates the stall cycles. The stall cycles are obtained by calculating summation of products of the penalties and the numbers of occurrences. Therefore, based on the execution information 80, the total cycles are read to be 20,000,000, and the stall cycles are calculated to be 12,000,000 (=12×150,000+200×50,000+10×20,000).

In the Step A5, the clock change module 50 checks whether or not the execution constraint 90 is satisfied. Here, the constraint condition is that "the execution efficiency is equal to or more than 50% (the stall cycles are equal to or less than 50%)". In the present concrete example, the execution efficiency is 40%, and thus the processing proceeds to the Step A6 (If satisfied, the processing returns back to the Step A2). The execution efficiency is calculated based on the facts that the total cycles are 20,000,000 and the stall cycles are 12,000,000.

In the Step A6, when the clock change module 50 sets the clock frequency of the application 70$i$ x-times as high, not only the occurrence number of the event but also the penalty becomes x-times as large, and thus the stall cycles become x2-times as much. Therefore, the clock magnification ratio x that can make the execution efficiency equal to or higher than 50% satisfies a relationship: 12,000,000×x×x/20,000,000×x≦0.5. Thus, x≦⅚ is required. In the present Step, the clock frequency of equal to or less than ⅚ times as high is specified. Here, in order to obtain the maximum performance, the clock of ⅚ times as high is specified.

In the present concrete example, the specified execution efficiency can be achieved. By using an index of the execution efficiency, it is possible to specify trade-off of the performance and the power consumption to user. Thus, efficient utilization of the power becomes possible.

A second concrete example is different from the above-mentioned first concrete example in that an event whose penalty is not decreased even when the clock is lowered is treated. Let us consider a case where, in addition to the execution constraint 90 given in the first concrete example, the "RS_UOPS_DISPATCHED.CYCLES_NONE" with the penalty of 1 is given as the events to be measured. The event having the negative penalty includes both of the stall cycles independent of the operation clock of the CPU 20 and the stall cycles dependent on the clock as in the case of the first concrete example. As in the case of the first concrete example, the execution information is created in the Step A1, and the numbers of occurrences of the events are read out in the Step A2. Moreover, in the Step A3, increments of the numbers of occurrences of the events are calculated, and the numbers of occurrences are updated as shown in the following Table. 3.

TABLE 2

| EVENT IDENTIFIER | PENALTY | NUMBER OF OCCURRENCES |
|---|---|---|
| CPU_CLK_UNHALDTED.CORE | 0 | 20,000,000 |
| MEM_LOAD_RETIRED.L1D_LINE_MISS | 12 | 150,000 |
| MEM_LOAD_RETIRED.L2D_LINE_MISS | 200 | 50,000 |
| MEM_LOAD_RETIRED.DTLB_LINE_MISS | 10 | 20,000 |

TABLE 3

| EVENT IDENTIFIER | PENALTY | NUMBER OF OCCURRENCES |
|---|---|---|
| CPU_CLK_UNHALDTED.CORE | 0 | 20,000,000 |
| RS_UOPS_DISPATCHED.CYCLES_NONE | −1 | 16,000,000 |
| MEM_LOAD_RETIRED.L1D_LINE_MISS | 12 | 150,000 |
| MEM_LOAD_RETIRED.L2D_LINE_MISS | 200 | 50,000 |
| MEM_LOAD_RETIRED.DTLB_LINE_MISS | 10 | 20,000 |

In the Step A4, the clock change module 50 calculates the stall cycles. First, cycles other than the stall cycles are calculated from a difference between the events with the penalty of 0 and the events with the negative penalty. The stall cycles due to the events with the positive penalties are calculated in the same manner as in the first concrete example. A difference between the number of occurrences of the event with the negative penalty and the stall cycles due to the events with the positive penalties is the stall cycles independent of the clock. Consequently, the cycles other than the stall cycles are calculated to be 4,000,000 cycles, the stall cycles independent of the clock are calculated to be 4,000,000 cycles, and the stall cycles dependent on the clock are calculated to be 12,000,000 cycles.

In the Step A5, the execution efficiency is 20%, and thus the processing proceeds to the Step A6. The execution efficiency is calculated based on the facts that the total cycles are 20,000,000 and the stall cycles are 16,000,000.

In the Step A6, the clock change module 50 specifies the clock of the application 70$i$. In order to make the execution efficiency equal to or higher than 50%, the x satisfying a relationship: (12,000,000×x×x+4,000,000×x)/20,000,000×x≦0.5 is found. Then, x≦0.5 is required, and the clock change module 50 specifies the clock equal to or less than 0.5 times as high. Here, in order to maximize the performance, 0.5 times is specified. In the present concrete example, the specified execution efficiency can be achieved in consideration of a broader range of stalls, and it is thus possible to achieve more efficient utilization of the power as compared with the first concrete example.

Next, the third concrete example is different from the above-described second concrete example in that the constraint condition of the execution constraint 90 is "the CPU utilization being equal to or more than 75%" (idle cycles being equal to or less than 25%), two applications are treated, and the clock that can be specified is restricted to six patterns (1.6 GHz, 1.4 GHz, 1.2 GHz, 1.0 GHz, 0.8 GHz and 0.6 GHz).

As in the case of the second concrete example, the execution information 80 are created for the respective two applications in the Step A1, and the numbers of occurrences of the events are read out in the Step A2. Moreover, in the Step A3, increments of the numbers of occurrences of the events are calculated, and the numbers of occurrences of the events regarding the first application are updated as shown in the following Table. 4. Note that what kinds of clock can be specified also is read in the Step A1.

TABLE 4

| EVENT IDENTIFIER | PENALTY | NUMBER OF OCCURRENCES |
|---|---|---|
| CPU_CLK_UNHALDTED.CORE | 0 | 4,800,000 |
| RS_UOPS_DISPATCHED.CYCLES_NONE | −1 | 3,840,000 |
| MEM_LOAD_RETIRED.L1D_LINE_MISS | 12 | 50,000 |
| MEM_LOAD_RETIRED.L2D_LINE_MISS | 200 | 12,000 |
| MEM_LOAD_RETIRED.DTLB_LINE_MISS | 10 | 7,200 |

The execution information regarding the second application is updated as shown in the following Table. 5.

TABLE 5

| EVENT IDENTIFIER | PENALTY | NUMBER OF OCCURRENCES |
|---|---|---|
| CPU_CLK_UNHALDTED.CORE | 0 | 2,400,000 |
| RS_UOPS_DISPATCHED.CYCLES_NONE | −1 | 1,800,000 |
| MEM_LOAD_RETIRED.L1D_LINE_MISS | 12 | 10,000 |
| MEM_LOAD_RETIRED.L2D_LINE_MISS | 200 | 6,000 |
| MEM_LOAD_RETIRED.DTLB_LINE_MISS | 10 | 3,000 |

In the Step A4, the stall cycles are calculated with respect to the respective two applications. They are calculated in the same manner as in the case of the second concrete example. The stall cycles of the first application are given by (3,072,000×x×x+768,000×x), wherein x is the clock magnification ratio. The stall cycles of the second application are calculated by (1,350,000×y×y+450,000×y), wherein y is the clock magnification ratio. Moreover, the execution time of the application 70 managed by the system software 60 also is read out, which is different from the second concrete example. In the present concrete example, the execution time of the first application is 30%, the execution time of the second application is 15%, and idle (neither application is executed) is 55%. In the present concrete example, it is assumed that the CPU 20 operates at the minimum clock at the idle time.

In the Step A5, it is judged whether or not the constraint condition of the execution constraint 90: "the CPU utilization being equal to or more than 75%" is satisfied. Since sum of the utilization of the first and second applications is 45%, the constraint condition is not satisfied, and thus the processing proceeds to the Step A6.

In the Step A6, the clock frequency is specified with respect to the first and second applications. It should be noted here that the clock frequency is specified such that the execution efficiency is maximized and the specified CPU utilization is achieved. Since the stall cycles of the first application are (3,072,000×x xx+768,000×x), a relationship between the clock frequency and the CPU utilization is given as follows. Note that the execution efficiency is calculated in the same manner as in the second concrete example, and the CPU utilization is calculated from a product of the measured CPU utilization, a ratio between the measured clock frequency and an assumed clock frequency, and a ratio between the execution efficiency at the measured clock and the execution efficiency at the assumed clock frequency. The result is as shown in the following Table. 6.

TABLE 6

| CLOCK | STALL CYCLES | TOTAL CYCLES | EXECUTION EFFICIENCY | CPU UTILIZATION |
|---|---|---|---|---|
| 1.6 | 3840000 | 4800000 | 20.00% | 30.00% |
| 1.4 | 3024000 | 3864000 | 21.74% | 31.54% |
| 1.2 | 2304000 | 3024000 | 23.81% | 33.60% |
| 1 | 1680000 | 2280000 | 26.32% | 36.48% |
| 0.8 | 1152000 | 1632000 | 29.41% | 40.80% |
| 0.6 | 720000 | 1080000 | 33.00% | 48.00% |

Since the stall cycles of the second application are (1,350,000×y×y+450,000×y), a relationship between the clock and the CPU utilization is as shown in the following Table. 7.

TABLE 7

| CLOCK | STALL CYCLES | TOTAL CYCLES | EXECUTION EFFICIENCY | CPU UTILIZATION |
|---|---|---|---|---|
| 1.6 | 1800000 | 2400000 | 25.00% | 15.00% |
| 1.4 | 1427344 | 1952344 | 26.894% | 15.94% |
| 1.2 | 1096875 | 1546785 | 29.09% | 17.19% |
| 1 | 808593.8 | 1183594 | 31.68% | 18.94% |
| 0.8 | 562500 | 862500 | 34.78% | 21.56% |
| 0.6 | 358593.8 | 583593.8 | 38.55% | 25.94% |

As described above, the first application is the lowest in the execution efficiency, until the clock frequency at which the first application is executed is lowered to 1 GHz. The CPU utilization is checked every time the clock frequency is lowered to 1.4 GHz, 1.2 GHz in order, and it is turned out that, even at 1 GHz, the CPU utilization is 41.48% which is not more than 75%. Therefore, the clock frequency of the first application is assumed to be 1 GHz, and then the clock frequency for the second application having the lowest execution efficiency is lowered by one level from 1.6 GHz to 1.4 GHz. The CPU utilization at this time is 42.42%, and thus the application having the lowest execution efficiency becomes the first application again. In this manner, the clock for the application having the lowest execution efficiency is lowered in a stepwise manner and it is checked whether or not the CPU utilization satisfies the constraint condition. In the present concrete example, eventually, the clock frequency used for executing the first application is lowered to 0.8 GHz and the clock frequency used for executing the second application is lowered to 1 GHz. Consequently, the CPU utilization becomes 75.19% and satisfies the constraint condition for the first time. These are the clock frequencies that satisfy the constraint condition and can achieve the highest performance with the highest execution efficiency. In the present concrete example, those clock frequencies are specified.

Figure 5:
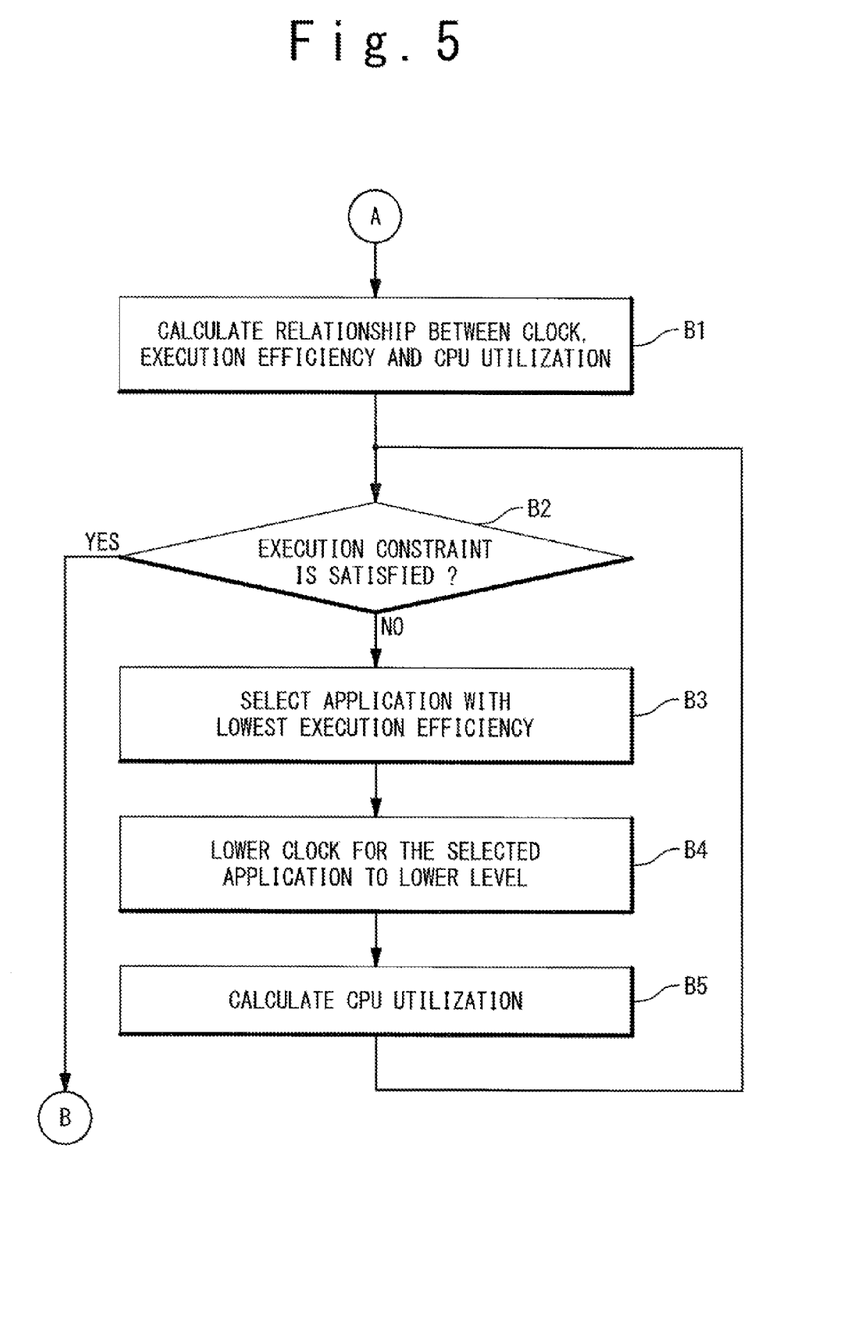
FIG. 5 is a flow chart for calculating CPU utilization in the third concrete example of the operating method of the computer according to the present invention.

A method of calculating the clock in the present concrete example is summarized as Steps B1 to B5 in the flow chart shown in FIG. 5. First, with regard to all the clock frequencies that can be specified, the clock frequency, the execution efficiency and the CPU utilization are calculated with respect to each application (Step B1). Next, it is determined whether or not the execution constraint 90 given as the CPU utilization is satisfied (Step B2). If the execution constraint 90 is satisfied (Step B2: Yes), the assumed clock frequency is specified. If the execution constraint is not satisfied (Step B2: No), the processing proceeds to Step B3. An application having the lowest execution efficiency among execution efficiencies corresponding to the clock frequencies assumed for each application 70 is selected (Step B3). The clock frequency assumed for the application 70 is lowered by one level (Step B4). At the end, the CPU utilization corresponding to the assumed clock is calculated (Step B5).

According to the present concrete example, it is possible to execute the application 70 within the specified range of the CPU utilization. If the user allows a high CPU utilization, the application 70 is executed with low power (at low clock) for a long period of time. If the user allows only a low CPU utilization, the application 70 is executed with high power (at high clock) for a short period of time. In the case where the high CPU utilization is specified, the power consumption due to the stall cycles can be suppressed by executing the application 70 at the low clock frequency. According to the present concrete example, the execution clock frequency of the application 70 is adjusted such that the stall cycles are reduced (namely, the execution efficiency is increased). As a result, the power consumption can be suppressed more than the reduction in the performance.

Next, the fourth concrete example is different from the above-mentioned third concrete example in that the constraint condition of the execution constraint 90 is "the power consumption being equal to or less than 8.5 W" and a relationship between the clock frequency and the power consumption is added to the execution constraint 90. In the present concrete example, the relationship between the clock frequency and the power consumption is given as shown in the following Table. 8.

TABLE 8

| CLOCK | POWER |
|---|---|
| 1.6 GHz | 24.5 W |
| 1.4 GHz | 19.62832 W |
| 1.2 GHz | 13.58504 W |
| 1.0 GHz | 9.420724 W |
| 800 MHz | 5.970185 W |
| 600 MHz | 3.812811 W |

As in the case of the above-described third concrete example, the execution information 80 are created for the respective two applications in the Step A1, and the numbers of occurrences of the events are read out in the Step A2. Moreover, increments of the numbers of occurrences of the events are calculated in the Step A3. In the Step A4, the execution time of the application 70 is read out and the stall cycles are calculated. Note that the relationship between the clock frequency and the power consumption also is read in the Step A1.

In the Step A5, it is determined whether or not the constraint condition of the execution constraint 90: "the power consumption being equal to or less than 8.5 W" is satisfied. Here, let us consider a case where the first and second applications both operate at 1.6 GHz. As in the case of the above-described third concrete example, the CPU utilizations due to the first and second applications and idling are 30%, 15% and 55%, respectively. In this case, the sum of products of the CPU utilizations and the power consumptions is 13.12205 (=0.3×24.5+0.15×24.5+0.55×3.812811). Therefore, the constraint condition is not satisfied, and the processing proceeds to the Step A6.

In the Step A6, the clock frequency is specified with respect to the first and second applications. It should be noted here that the clock frequency is specified such that the execution efficiency is maximized and the power consumption falls within the specified range. The relationship between the clock frequency, the execution efficiency and the CPU utilization is calculated as in the case of the above-described third concrete example. In addition to that, according to the present concrete example, a product of the CPU utilization and the power consumption corresponding to the clock frequency is calculated as the power consumption by the application. The relationship between the clock frequency, the execution efficiency, the CPU utilization and the power consumption of the first application is as shown in the following Table. 9.

TABLE 9

| CLOCK | EXECUTION EFFICIENCY | CPU UTILIZATION | POWER CONSUMPTION |
| --- | --- | --- | --- |
| 1.6 | 20.00% | 30.00% | 7.35 |
| 1.4 | 21.74% | 31.54% | 6.191331 |
| 1.2 | 23.81% | 33.60% | 4.564573 |
| 1 | 26.32% | 36.48% | 3.433668 |
| 0.8 | 29.41% | 40.80% | 2.435836 |
| 0.6 | 33.33% | 48.00% | 1.83015 |

The relationship between the clock, the execution efficiency, the CPU utilization and the power consumption of the second application is as shown in the following Table. 10.

TABLE 10

| CLOCK | EXECUTION EFFICIENCY | CPU UTILIZATION | POWER CONSUMPTION |
| --- | --- | --- | --- |
| 1.6 | 25.00% | 15.00% | 3.675 |
| 1.4 | 26.89% | 15.94% | 3.128263 |
| 1.2 | 29.09% | 17.19% | 2.334929 |
| 1 | 31.68% | 18.94% | 1.78405 |
| 0.8 | 34.78% | 21.56% | 1.287321 |
| 0.6 | 38.55% | 25.94% | 0.988948 |

Let us assume that the clock frequency used for the execution of the first application is 1 GHz. In this case, the power consumption is 3.423668 W and the utilization is 36.48%. As for the second application executed at 1.6 GHz, the power consumption is 3.675 W and the CPU utilization is 15%. Thus, 48.52% of the CPU time is the idling, and the power consumption at the idling is 1.8499758972 W. Therefore, the total power consumption is about 8.95 W. Furthermore, let us assume that the clock frequency used for the execution of the second application is 1.4 GHz. In this case, the power consumption due to the second application is 3.128263 W (decreased by 0.546737 W), and the CPU utilization is 15.94% (increased by 0.94%). Therefore, the power consumption at the idling time is increased by 0.0358404234 W, and consequently the total is decreased by about 0.511 W. Therefore, the total power consumption falls below 8.5 W for the first time. According to the present concrete example, the clock frequency used for the first application is specified to be 1 GHz and the clock frequency used for the second application is specified to be 1.4 GHz, in order to minimize the CPU utilization and satisfy the constraint condition on the power consumption.

According to the present concrete example, it is possible to execute the application within the specified range of the power consumption. Moreover, according to the present concrete example, the execution clock frequency of the application 70 is adjusted such that the stall cycles are reduced (namely, the execution efficiency is increased). As a result, the reduction in the performance can be suppressed more than the suppression of the power consumption.

The present invention further has the following features.

(1) The computer system according to the present invention uses a CPU having an event counter, a cache and an arithmetic unit to operate system software and at least one application software. The computer system further has a clock change module operating under control of said event counter and changes, based on stall cycles of said application software, the clock at which said application software is executed.

(2) A method of operating a computer system according to the present invention is a method of operating a computer that uses a CPU to operate system software and at least one application software. The method includes: a step of detecting, with respect to each application software, stall cycles in which an instruction is not executed by said CPU; and a step of changing an operation clock of said CPU based on said detected stall cycles.

(3) A program according to the present invention is a computer-readable program for achieving the above-described (2) method of operating the computer system.

(4) In the computer system of the above-described (1), when a range of execution efficiency as a quotient of cycles other than said stall cycles and total cycles is specified, said clock change module executes said each application software based on said stall cycles.

(5) In the computer system of the above-described (1), when a range of execution efficiency is specified, said clock change module changes, based on stall cycles dependent on clock and stall cycles independent of the clock, the clock for executing said application software to achieve said specified execution efficiency.

(6) In the computer system of the above-described (1), when a range of CPU utilization is specified, said clock change module changes, based on said stall cycles, the clock for executing said application software to achieve said specified CPU utilization.

(7) In the computer system of the above-described (1), when a range of power consumption is specified, said clock change module changes, based on said stall cycles, the clock for executing said application software to achieve said specified power consumption.

(8) In the computer system of any of the above-described (1), (4) to (7), said clock change module estimates change in said stall cycles due to the changing of the clock for executing said application software to specify said clock.

(9) In the computer system of any of the above-described (1), (4) to (8), said clock change module estimates change in said stall cycles and execution efficiency due to the changing of the clock for executing said application software to specify said clock.

(10) In the computer system of the above-described (6) or (7), said clock change module estimates change in said stall cycles, execution efficiency and CPU utilization efficiency due to the changing of the clock for executing said application software to specify said clock.

According to the present invention, in a general computer system including a CPU whose operation clock can be changed, required information processing can be executed while reducing the power consumption. In particular, in a data center that executes large amount of information processing and consumes large amount of electric power, it is possible to reduce the power consumption of the computer system.

The preferable exemplary embodiments of the computer system and the operating method of the computer system according to the present invention are described above in detail by describing some concrete examples. However, it should be noted that those exemplary embodiments are merely examples of the present invention and do not limit the present invention. It will be easily understood by those skilled in the art that the present invention can be modified variously depending on specific purposes without departing from the spirit and scope of the present invention. Moreover, it is obvious for those skilled in the art that the operating method of the computer according to the present invention can be embodied by program and can be executed by the computer.

This application is based upon and claims the benefit of priority from Japanese patent application No. 2008-101282, the disclosure of which is incorporated herein in its entirely by reference.

The invention claimed is:

1. A computer system comprising:
   a CPU that executes system software and at least one application software and includes an event counter, a cache and an arithmetic unit; and
   a clock change module operating under control of said event counter,
   wherein said clock change module changes, based on stall cycles of said application software, a clock frequency at which said application software is to be executed,
   a constraint condition specifies a desired range of any execution efficiency being a ratio of cycles other than said stall cycles to total cycles, CPU utilization and power consumption, and
   said clock change module changes, based on said stall cycles, said clock frequency such that said constraint condition is satisfied.

2. The computer system according to claim 1,
   wherein when a range of the execution efficiency is specified, said clock change module changes, based on said stall cycles, said clock frequency such that said specified range of execution efficiency is satisfied, and then executes said application software.

3. The computer system according to claim 1,
   wherein when a range of the execution efficiency is specified, said clock change module changes, based on stall cycles dependent on clock and stall cycles independent of the clock, said clock frequency such that said specified range of execution efficiency is satisfied, and then executes said application software.

4. The computer system according to claim 1,
   wherein when a range of the CPU utilization is specified, said clock change module changes, based on said stall cycles, said clock frequency such that said specified range of CPU utilization is satisfied, and then executes said application software.

5. The computer system according to claim 1,
   wherein when a range of the power consumption is specified, said clock change module changes, based on said stall cycles, said clock frequency such that said specified range of power consumption is satisfied, and then executes said application software.

6. The computer system according to claim 1,
   wherein said clock change module estimates change in said stall cycles due to the changing of the clock frequency at a time when said application software is executed, to specify said clock frequency.

7. The computer system according to claim 1,
   wherein said clock change module estimates change in said stall cycles and the execution efficiency due to the changing of the clock frequency at a time when said application software is executed, to specify said clock frequency.

8. The computer system according to claim 4,
   wherein said clock change module estimates change in said stall cycles, the execution efficiency and the CPU utilization due to the changing of the clock frequency at a time when said application software is executed, to specify said clock frequency.

9. A method of operating a computer system, comprising:
   executing, by a CPU, system software and at least one application software;
   detecting, with respect to each application software, stall cycles in which an instruction is not executed by said CPU; and
   changing an operation clock frequency of said CPU based on said detected stall cycles,
   wherein a constraint condition specifies a desired range of any execution efficiency being a ratio of cycles of than said stall cycles to total cycles, CPU utilization, and power consumption, and
   said changing said operation clock frequency comprises: changing, based on said stall cycles, said operation clock frequency such that said constraint condition is satisfied.

10. A computer-readable recording medium in which computer-readable program codes for achieving the method of operating the computer system according to claim 9 is recorded.

* * * * *